Dec. 25, 1951 T. N. CARTER 2,579,791
STARTING AND STOPPING MECHANISM
Filed Dec. 23, 1949 3 Sheets-Sheet 3

INVENTOR.
Thomas N. Carter
BY
Robert S. Dunham
ATTORNEY

UNITED STATES PATENT OFFICE 2,579,791

STARTING AND STOPPING MECHANISM

Thomas N. Carter, Bayside, N. Y., assignor to Cameron Machine Company, Brooklyn, N. Y., a corporation of New York Application December 23, 1949, Serial No. 134,753

6 Claims. (Cl. 192—144)

This invention relates to starting and stopping mechanism for controlling the operation of a rotating shaft in a machine.

It is among the objects of the invention to provide a quick-acting and dependable starting and stopping mechanism for coupling a shaft to be driven and a rotating power shaft and for uncoupling the coupled shafts and immediately stopping the rotation of the driven shaft. While the mechanism may be suitable for use with various types of machines, the invention will be disclosed in connection with its application for controlling the operation of the rollers of a winding machine for winding webs of flexible material into rolls. The winding rollers of a winding machine are generally driven only during a winding operation and since the machine is customarily used for conducting a series of winding operations it is important to conserve time between the winding operations during which a wound roll of material is removed and a new core or winding shaft is placed in the machine for winding a new roll of material.

The mechanism of the present invention is admirably suited for quickly bringing the rotating rollers to rest and for initiating their rotation when a new winding operation is to be started. The mechanism employing the principle of the invention includes a toggle joint which is operable in one direction to effect the release of a brake acting on a driven shaft and the coupling of the shaft to a power shaft. Upon initiation of the movement of the toggle joint in the reverse direction the brake is caused to act on the driven shaft and the driven shaft is immediately uncoupled from the power shaft. An electrical circuit is provided which operates mechanical means to collapse the toggle joint to effect the discontinuance of the drive of the driven shaft by an uncoupling operation. As the toggle joint starts to collapse another electrical circuit causes the application of the brake to the driven shaft. The structure by which these accomplishments are attained is described in the accompanying specification and demonstrated by the drawing which shows by way of illustration a preferred embodiment and the principle of the invention, and the best manner which has been contemplated for applying that principle.

Figure 2:
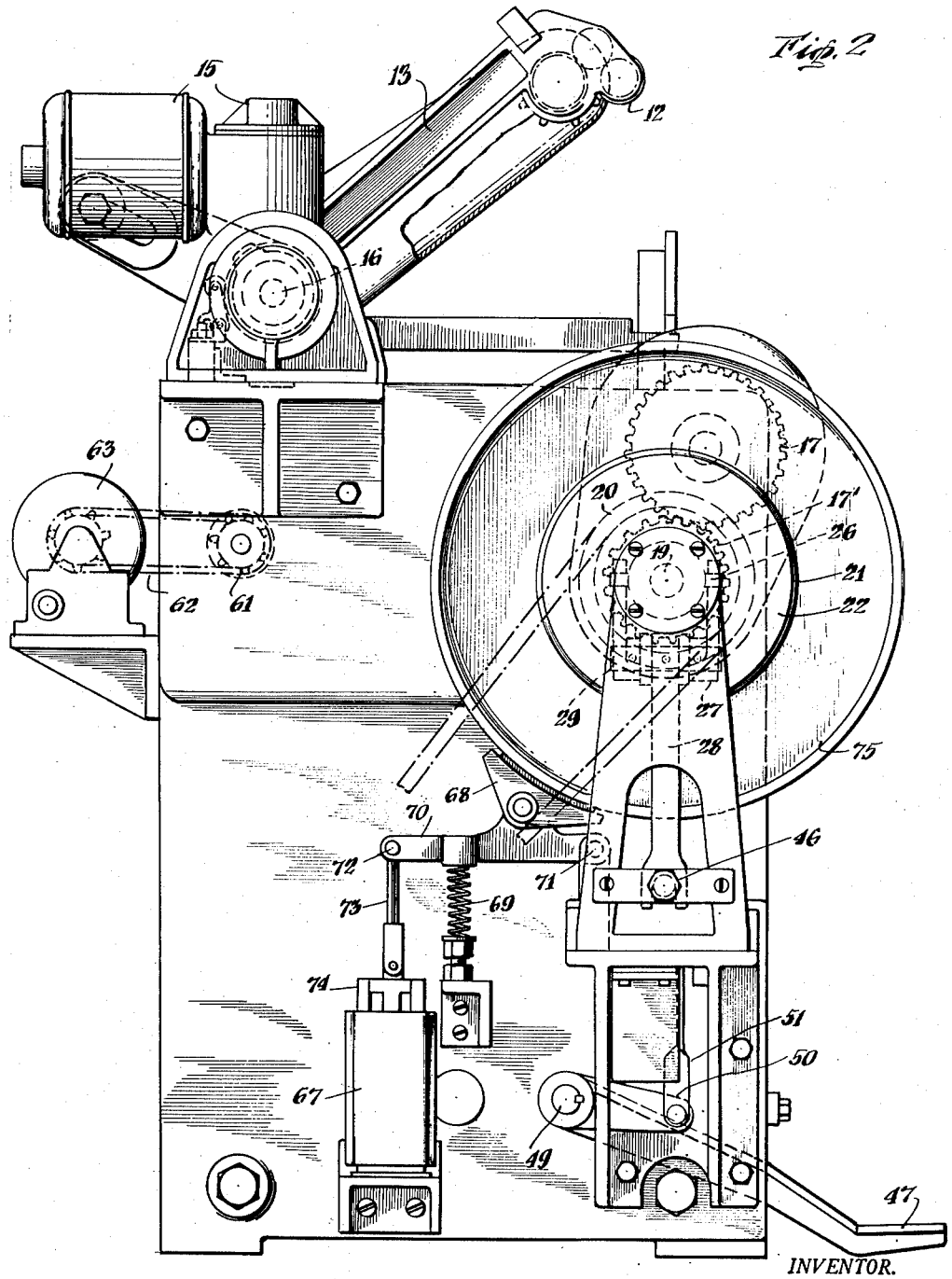
Fig. 2 is a side elevational view of the machine as seen from the left of Fig. 1.

The winding machine illustrated has two surface winding rollers 10 and 11 which are spaced apart and rotate in the same direction. These winding rollers support a core or winding shaft in the valley between them. The flexible material is wound around the winding shaft. The winding rollers frictionally engage the surface of the flexible material on the winding shaft to cause the material to be accumulated thereon. A top-pressure surface or riding roller 12 is depressible into engagement with the material contained in the roll of material being wound during a winding operation. The riding roller is carried by a pair of arms 13 and 14 which are mounted upon a pivot shaft 16. During a winding operation the riding roller 12 rests on the roll of material being wound and the roller rises as the diameter of the roll increases. When the winding of a roll of material is completed the riding roller 12 is raised to permit access to the finished roll of material. For raising the riding roller 12 from the roll of material, power may be used. For this purpose a reversible motor and speed reducing unit 15 is provided. This unit is connected to the pivot shaft 16 by a one-way clutch 18 which provides a positive drive when the pivot shaft is to be rotated to raise the riding roller 12 to an elevated position as shown in Fig. 2.

Figures 3, 4:
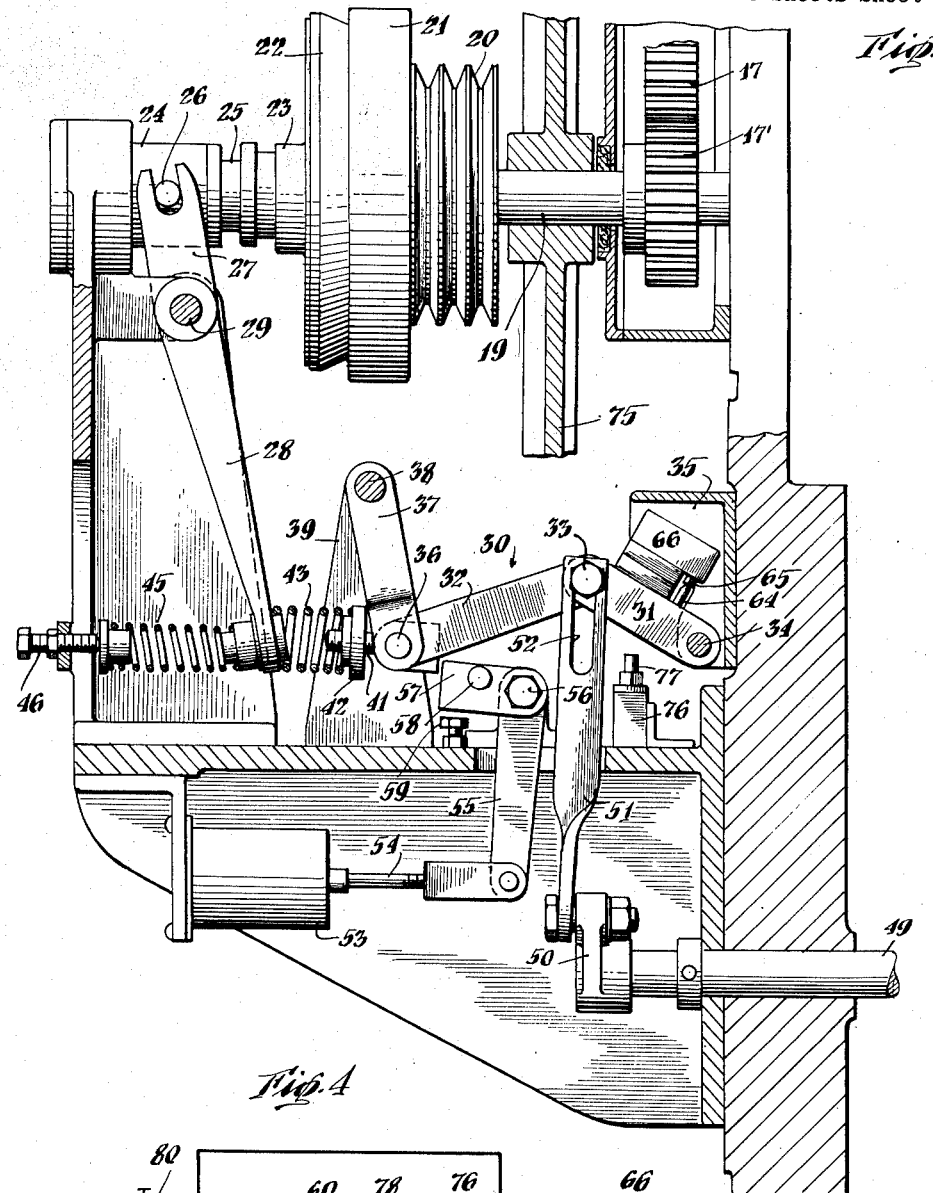
Fig. 3 is a front view of the starting and stopping mechanism as seen in Fig. 1, but with the mechanism shown in stopping position.
Fig. 4 is a circuit diagram in which the positions of switches correspond with the stopped condition of the machine.

During a winding operation, the winding rollers 10 and 11 and the riding roller 12 are driven and their drive is attained through a pair of gears 17 and 17', Fig. 3, the former being keyed to the shaft of the roller 10 and the latter being keyed to the shaft 19, which is adapted to be driven from a power shaft. So much of the winding machine has been described as will provide an understanding of the relationship of the mechanism of the present invention thereto. Reference may be had to the copending application Serial No. 134,751, which was filed December 23, 1949, for a fuller description of the same. It is sufficient for the purposes of the present disclosure to understand that power is transmitted to the machine through the shaft 19 which is coupled and uncoupled to a source of power by a friction clutch and that any of numerous conventional coupling devices may be used for that purpose.

In the drawing there is illustrated a suitable clutch construction which will be described to demonstrate its relationship to the present invention. The power-driven shaft 19 of the machine is supported for rotation in bearings carried by the machine frame. A loose belt pulley 20 to which the outer member 21 of the clutch is engaged, is mounted for rotation about the shaft 19. The pulley 20 is driven from a source of power (not shown). The cone or inner slidable clutch member 22 is fastened to turn with the shaft 19 by a spline which permits its axial movement for coupling and uncoupling the clutch. The spline is seated in a longitudinal groove in the shaft 19 and is engaged by a longitudinal groove within the hub 23 of the slidable clutch member.

The sliding movement of the cone member 22 is controlled through a collar 24 to which a sleeve 25 is adjustably connected. The sleeve and the collar are free on the shaft 19 and are slidable longitudinally of the shaft 19 to effect coupling and uncoupling of the clutch. The clutch is provided with the usual springs (not shown) which normally tend to disengage the clutch members. The collar 24 is provided with diametrically opposite studs 26 which are engaged by the yoke 27 of a lever 28, the lever 28 being pivotally mounted on a shaft 29. The two members of the clutch are engaged when the lever is rocked clockwise (Fig. 1), and a counterclockwise rotation of the lever results in disengaging the clutch (Fig. 2).

The position of the lever 28 is controlled by a toggle joint 30, including two links 31 and 32 connected together by a knee pin 33. One end of the link 31 is pivotally mounted on a pivot pin 34 which is supported in a bracket 35 carried by the frame of the machine. The pin 34 constitutes a fixed abutment for one end of the toggle joint. At the other end of the toggle joint, at the end of the link 32, there is mounted a pivot pin 36 which extends through the link 32 and an arm 37. The arm 37 is pivotally mounted on a pin 38 carried by a bracket 39. The arm 37 restricts the movement of the pin 36 as the toggle joint is extended (i. e. straightened) and collapsed.

Figure 1:
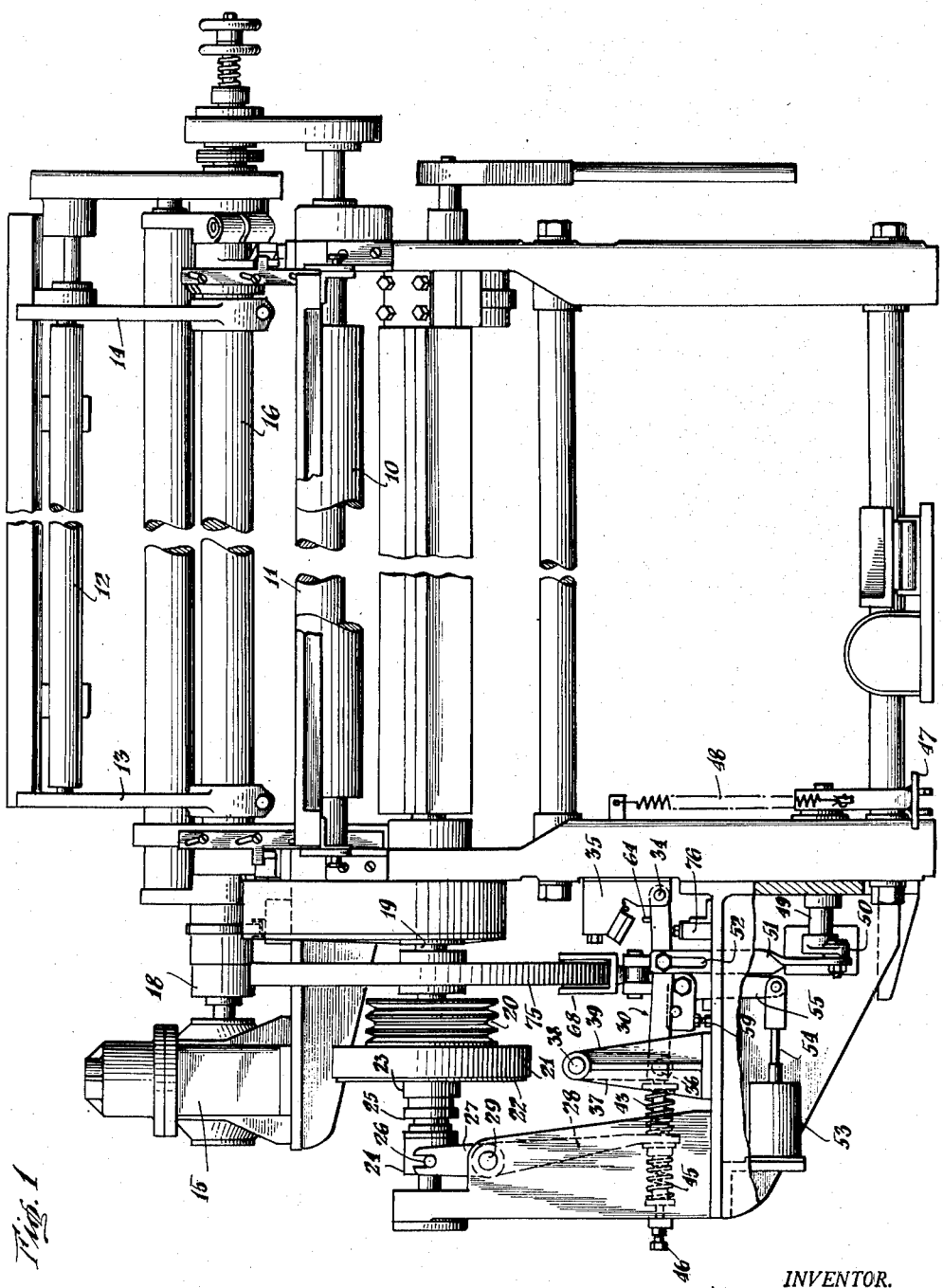
Fig. 1 is a front elevational view showing the starting and stopping mechanism of the present invention as applied to a winding machine.

When the shaft 19 and the rollers of the machine are at rest the toggle joint is in a broken or collapsed position, as illustrated in Fig. 3, and when the clutch is engaged and the rollers are being driven, the toggle joint is in an extended position, as illustrated in Fig. 1. The force for rocking the lever 28 from the position shown in Fig. 3 to the position shown in Fig. 1 is transmitted from the toggle joint through the pin 36, the eye bolt 41, the retaining nut 42 and the spring 43. The tension in the spring 43 may be adjusted by the nut 42. The tension in the spring 43 is great enough to overcome the tension in the spring 45 which extends between the lever 28 and the adjusting screw 46. The force which is transmitted to the spring 43 resiliently presses the sliding clutch member 22 into engagement with the outer clutch member 21. In the coupled position, Fig. 1, the belt pulley 20 drives the shaft 19 through the clutch.

The toggle joint is extended and the clutch is engaged by the manual operation of a conveniently located member such as the foot treadle 47, Figs. 1 and 2. The treadle normally is held in and restored to an elevated position by the spring 48 (Fig. 1). The treadle is carried by a shaft 49 which also has fixed to it an arm 50 to which the lower end of a link 51 is pivotally connected. The upper end of the link 51 has a slot 52 which engages the knee pin 33 and extends the toggle joint when the treadle is depressed.

The toggle joint is broken or collapsed to disengage the clutch members to discontinue the drive of the shaft 19 by the pulley 20. This is accomplished by the energization of a solenoid 53 which has a core fastened to a link 54, pivotally connected to a lever 55 which is mounted for rocking about a pivot pin 56. The lever 55 carries a crank 57 from which a lug 58 projects. A stop 59 limits the counterclockwise movement of the crank. The stop 59 and the crank 57 support the toggle joint in extended position with the center of the knee pin 33 slightly below a straight line extending between the centers of the pins 34 and 36, Fig. 1. When the solenoid 53 is energized, the crank 57 rotates clockwise and causes the lug 58 to press upwardly on the link 32 and break the toggle. Immediately upon the passing of the knee pin 33 beyond the straight line between the pins 34 and 36, the force stored in the spring 45 causes the lever 28 to rock counterclockwise and disengage the clutch members.

The solenoid 53 is energized by the closing of a switch 60 (Fig. 4), which is closed when the shaft 19 has completed a predetermined number of revolutions. In the winding machine described, this occurs when a predetermined length of web of flexible material has been wound into a roll. As the web of flexible material to be wound comes to the machine from a supply roll (not shown) it passes over a measuring roll 61, Fig. 2, which has a sprocket and chain connection 62 with a measuring-clock 63. After the measuring clock has completed a predetermined number of revolutions which are proportional to the number of revolutions made by the shaft 19 and the winding rollers 10 and 11, the switch 60 (Fig. 4) is closed by the clock and the operation of the machine is discontinued.

With the collapsing of the toggle joint as a result of the energization of the solenoid 53, the toggle joint moves to the position illustrated in Fig. 3 and in this position the stop 64, carried by the link 31, engages a plunger and opens the micro-switch 66 (Figs. 3 and 4). As this occurs the solenoid 67 is deenergized and the brake 68 is immediately released to the action of the spring 69, Fig. 2. The brake 68 is carried by a lever 70 which has one end supported by a shaft 71. The lever carries a pin 72 connected to a link 73 to which the core 74 of the solenoid 67 is attached. The pressure of the spring 69 causes the brake 68 to be pressed upon the rim of the flywheel 75 which is keyed to the shaft 19. The rotation of the shaft 19 and of the machine shafts driven thereby is stopped. The brake is released as the switch 66 is closed upon initiation of a toggle joint extending motion.

A micro-switch 76 is in series with the measuring-clock switch 60 and with the solenoid 53, and the switch 76 is open when the drive of the shaft 19 is disconnected (Figs. 3 and 4). When the clutch is engaged at the initiation of an operation by depressing the treadle 47, and the toggle joint 30 is extended, the link 31 comes into contact with a plunger 77 which causes the switch 76 to close. The switch remains closed during the period of time the shaft 19 is being driven. The drive of the shaft 19 is disconnected automatically when the switch 60 is closed by the measuring-clock 63, but the measuring-clock switch 60 cannot be effective to energize the solenoid 53 before the toggle joint is extended. When the solenoid 53 is energized by the closing of the switch 60, the toggle joint 30 is collapsed, the plunger 77 of the switch 76 is released, the switch 76 is opened, and the machine is immediately stopped. Neither the circuit 78 containing the toggle-joint actuating solenoid 53, nor the circuit 79 containing the brake-controlling solenoid 67 is energized when the machine is idle.

A switch 80 is connected in parallel with the series-connected switches 60 and 76 and in series with the solenoid 53 to enable the solenoid to be energized independently of the switches 60 and 76 for stopping the machine by manual control whenever stoppage is desired.

This invention is capable of numerous forms and various applications without departing from the essential features herein disclosed. It is therefore intended and desired that the specific description herein be deemed illustrative and not restrictive and that the patent shall cover all patentable novelty herein set forth; reference being had to the following claims rather than to the particular showing herein to indicate the scope of this invention.

What is claimed is:

1. In a machine having a rotatable shaft, a frame supporting said shaft, and a clutch for coupling said shaft to a source of power, the combination comprising a lever pivotally supported on said frame and having connection with said clutch for actuating the same, a toggle joint for rocking said lever to couple said clutch, said toggle joint including a pair of pivotally connected links with one of said links pivotally connected to a pivot supported in a stationary position with respect to said frame and the other of said links being connected to a movable pivot, means for guiding the movement of said movable pivot with respect to said stationary pivot, means intermediate said last-named pivot and said lever for transmitting force to said lever for coupling said clutch when said toggle joint is extended, means for extending said toggle joint, means for collapsing said toggle joint, resilient means for actuating said lever to uncouple said clutch when said toggle joint is collapsed, a brake wheel rotated by said shaft, a brake member for stopping said brake wheel, a spring acting on said brake member, a solenoid for controlling the operation of said brake member, a circuit for said solenoid, a switch in said circuit, and means controlled by said toggle joint for operating said switch to cause said brake member to act on said brake wheel when said toggle joint is collapsed.

2. In a machine having a rotatable shaft, a frame supporting said shaft, and a clutch for coupling said shaft to a source of power, the combination comprising a level pivotally supported on said frame and having connection with said clutch for actuating the same, a toggle joint for rocking said lever to couple said clutch, said toggle joint including a pair of pivotally connected links with one of said links pivotally connected to a pivot supported in a stationary position with respect to said frame and the other of said links being connected to a movable pivot, means for guiding the movement of said movable pivot with respect to said stationary pivot, means intermediate said last-named pivot and said lever for transmitting force to said lever for coupling said clutch when said toggle joint is extended, means for extending said toggle joint, means for collapsing said toggle joint, said last-named means including a movable member for engaging said toggle joint and a circuit including a solenoid for actuating said movable member when said circuit is energized, means for actuating said lever to uncouple said clutch when said toggle joint is collapsed, a brake wheel rotated by said shaft, a brake member for stopping said brake wheel, a spring normally urging said brake member into contact with said brake wheel, and means for controlling said brake member, said last-named means including a second circuit, a solenoid for retracting said brake member from said brake wheel and a switch, said switch being adapted to be held open when said toggle joint is collapsed and closed when said toggle joint is extended.

3. In a machine having a rotatable shaft, a frame supporting said shaft, and a clutch for coupling said shaft to a source of power, the combination comprising a lever pivotally supported on said frame and having connection with said clutch for actuating the same, a toggle joint for rocking said lever to couple said clutch, said toggle joint including a pair of pivotally connected links with one of said links pivotally connected to a pivot supported in a stationary position with respect to said frame and the other of said links being connected to a movable pivot, means for guiding the movement of said movable pivot with respect to said stationary pivot, means intermediate said last-named pivot and said lever for transmitting force to said lever for coupling said clutch when said toggle joint is extended, means for extending said toggle joint, means for collapsing said toggle joint, and resilient means for actuating said lever to uncouple said clutch when said toggle joint is collapsed, a brake wheel rotated by said shaft, a brake member for stopping said brake wheel, a spring for causing said brake member to move into engagement with said brake wheel, a circuit including a solenoid for retracting said brake member from said brake wheel, a switch for said circuit, and means operable by said toggle joint to actuate said switch.

4. In a machine having a rotatable shaft, a frame supporting said shaft, and a clutch for coupling said shaft to a source of power, the combination comprising a lever pivotally supported on said frame and having connection with said clutch for actuating the same, resilient means tending to uncouple said clutch and rock said lever in one direction, a toggle joint for rocking said lever in the opposite direction to couple said clutch, said toggle joint including a pair of pivotally connected links with one of said links pivotally connected to a pivot supported in a stationary position with respect to said frame and the other of said links being connected to a movable pivot, means for guiding the movement of said movable pivot with respect to said stationary pivot, means intermediate said movable pivot and said lever for transmitting force to said lever for coupling said clutch when said toggle joint is extended, means for extending said toggle joint, means for collapsing said toggle joint, said toggle joint-collapsing means including a movable member for engaging said toggle joint and a circuit including a solenoid for actuating said movable member when said circuit is energized and two switches in series connection with said solenoid, one of said switches being adapted to be closed by said toggle joint when said toggle joint is in extended position, and the other of said switches being open during the rotation of said shaft, and means controlled by said shaft to close said second-named switch when said shaft has completed a predetermined number of revolutions.

5. In a machine having a rotatable shaft, a frame supporting said shaft, and a clutch for coupling said shaft to a source of power, the combination comprising a lever pivotally supported on same frame and having connection with said clutch for actuating the same, resilient means tending to uncouple said clutch and rock said lever in one direction, a spring having one end attached to said lever for rocking said lever in the opposite direction and its other end attached to means for guiding its movement relative to said frame, displaceable means for moving said guided end of said spring between spaced positions, means for actuating said displaceable means to move said guided end of said spring to transmit force through said spring for rocking said lever to cause coupling of said clutch, means for actuating said displaceable means to move said guided end of said spring towards its other position to permit uncoupling of said clutch, said last-named means including a circuit containing a solenoid and two switches in series connection with said solenoid, one of said switches being adapted to be closed by said displaceable means and the other of said switches being open when said clutch is coupled, and means controlled by said shaft to close said second-named switch so as to uncouple said clutch.

6. In a machine having a rotatable shaft, a frame supporting said shaft, and a clutch for coupling said shaft to a source of power, the combination comprising a lever pivotally supported on said frame and having connection with said clutch for actuating the same, a compressed spring having one end supported by said frame and its other end attached to one side of said lever, a second compressed spring having one end attached to the opposite side of said lever and its other end attached to guiding means for guiding its movement with respect to said frame, displaceable means for moving said guided end of said second spring, said displaceable means comprising a toggle joint having pivotal connection with said guided end of said second spring and a pivot fixed with respect to said frame, said toggle joint being adapted to be extended to hold said guided end of said second spring in one extreme position and being adapted to be collapsed for permitting said guided end of said second spring to move to another extreme position under the action of said springs, a stop for engaging said toggle joint when said toggle joint is in a collapsed condition whereby to maintain said toggle joint against the combined thrust of said springs, and actuating means for extending said toggle joint for moving said guided end of said second spring to the first-mentioned extreme position.

THOMAS N. CARTER.

REFERENCES CITED

The following references are of record in the file of this patent:

UNITED STATES PATENTS

| Number | Name | Date |
|---|---|---|
| 1,175,014 | Roger | Mar. 14, 1916 |
| 1,453,202 | Stevens | Apr. 24, 1923 |
| 2,158,484 | Poole et al. | May 16, 1939 |
| 2,384,909 | Geddings | Sept. 18, 1945 |

FOREIGN PATENTS

| Number | Country | Date |
|---|---|---|
| 74,601 | Austria | Sept. 10, 1918 |